US009090356B2

(12) United States Patent
Montgomery

(10) Patent No.: US 9,090,356 B2
(45) Date of Patent: Jul. 28, 2015

(54) SYSTEM AND METHOD FOR REDUCED FLAMMABILITY OF AN AIRCRAFT FUEL SYSTEM

(71) Applicant: Cessna Aircraft Company, Wichita, KS (US)

(72) Inventor: Michael Scott Montgomery, Wichita, KS (US)

(73) Assignee: Textron Innovations, Inc., Providence, RI (US)

( * ) Notice: Subject to any disclaimer, the term of this patent is extended or adjusted under 35 U.S.C. 154(b) by 192 days.

(21) Appl. No.: 13/966,738

(22) Filed: Aug. 14, 2013

(65) Prior Publication Data
US 2015/0048210 A1     Feb. 19, 2015

(51) Int. Cl.
*B64D 37/02* (2006.01)
*B64D 37/04* (2006.01)
*B64D 37/12* (2006.01)
*B64D 37/32* (2006.01)

(52) U.S. Cl.
CPC ............... *B64D 37/32* (2013.01); *B64D 37/04* (2013.01)

(58) Field of Classification Search
CPC ................. B64D 37/04; B64D 37/32
See application file for complete search history.

(56) References Cited

U.S. PATENT DOCUMENTS

| 3,158,197 | A | * | 11/1964 | Blezard | 62/7 |
| 3,387,626 | A | * | 6/1968 | Morris et al. | 137/563 |
| 3,419,233 | A | * | 12/1968 | Wotton | 244/135 R |
| 4,913,380 | A | * | 4/1990 | Vardaman et al. | 244/135 R |
| 6,343,465 | B1 | | 2/2002 | Mortinov | |
| 6,736,354 | B2 | | 5/2004 | Goto et al. | |
| 7,007,893 | B2 | | 3/2006 | Loss et al. | |
| 7,152,635 | B2 | | 12/2006 | Moravee et al. | |
| 8,172,182 | B2 | | 5/2012 | Tanner | |

OTHER PUBLICATIONS

PCT Patent Application Serial No. PCT/US2014/051107 International Search Report and Written Opinion dated Nov. 24, 2014, 9 pages.

* cited by examiner

*Primary Examiner* — Philip J Bonzell
(74) *Attorney, Agent, or Firm* — Lathrop & Gage LLP

(57) ABSTRACT

Disclosed is a method for controlling the flammability of fuel vapors in an aircraft main fuel tank that is located in whole or in part in the fuselage contour. The method comprises a fuel system architecture and fuel consumption sequencing maintaining liquid fuel in said main tanks during all normal operations. Ceasing the withdrawal of fuel from the main tank when the fuel reaches a predetermined level thereby limiting the volume and flammability exposure time of the fuel vapor ullage. Once the predetermined level is met the fuel is supplied from wing tanks throughout the remainder of the mission. The predetermined main tank fuel level at which wing tank fuel begins to be consumed is determined by the aircraft flight reserves fuel volume stored in the main tank as well as the amount necessary to continuously submerge the main tank fuel pumps during the entire mission.

5 Claims, 1 Drawing Sheet

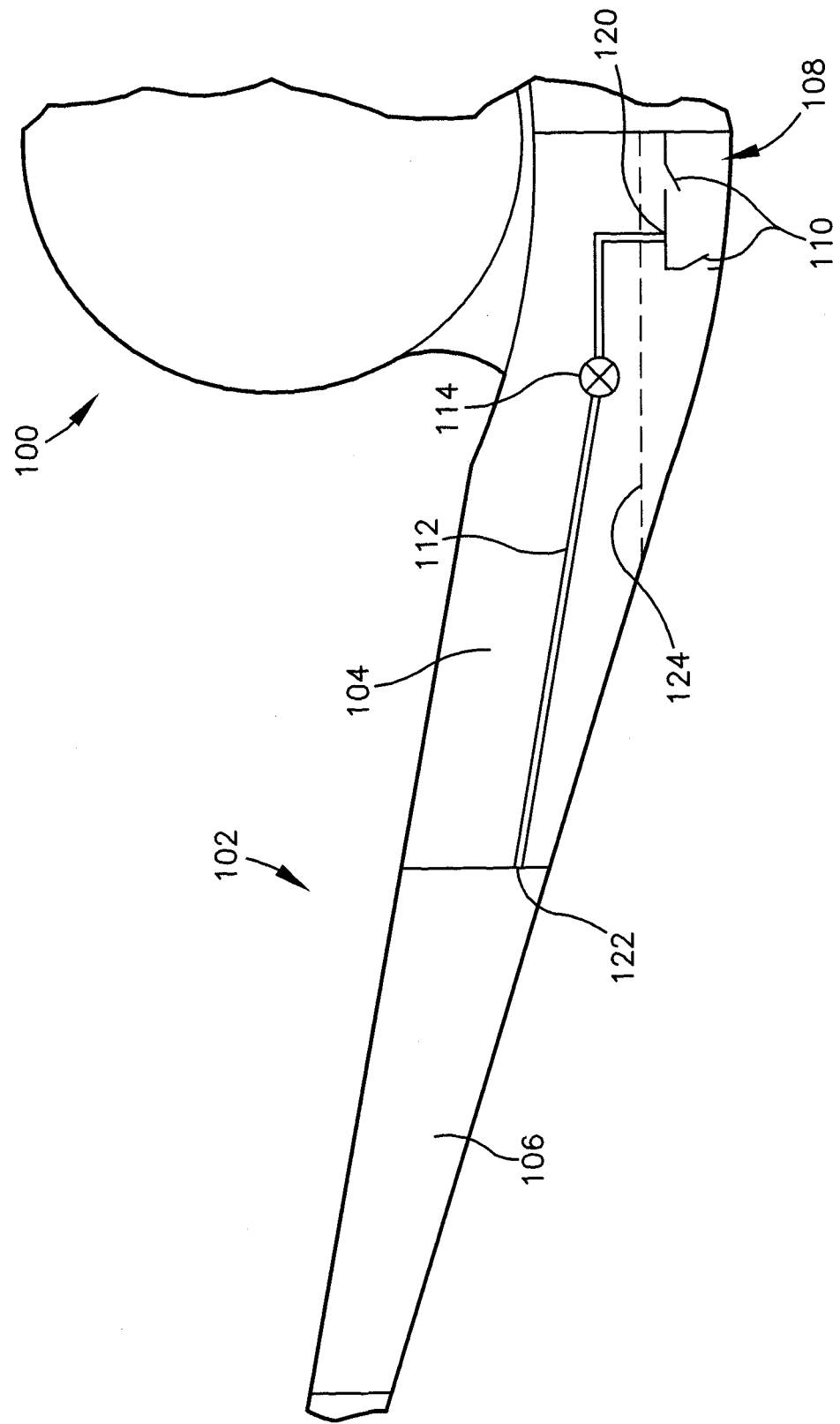

SYSTEM AND METHOD FOR REDUCED FLAMMABILITY OF AN AIRCRAFT FUEL SYSTEM

FIELD OF THE INVENTION

This disclosure relates generally to a method for providing an aircraft the benefits of managed fuel consumption while ensuring that those fuel tanks located in whole or in part within the fuselage contour are low flammability tanks. More specifically this disclosure concerns fuel system arrangement and fuel consumption sequence which results in aircraft load alleviation and center of gravity envelope reduction while continuously maintaining fuel reserves in the inboard main tanks, which feed directly to their respective engines.

BACKGROUND

The FAA requires that fuel tanks in new airplane designs have an average flammability exposure which meets established criteria. By design, conventional unheated aluminum wing tanks can satisfy the flammability exposure criteria.

The federal regulations also require that for any fuel tank other than a main tank located in whole or in part in the fuselage (any portion of the tank being located within the fuselage contour) flammability exposure must meet additional criteria, including provisions for warm day operations.

These additional criteria do not apply to tanks designated as "main tanks." Consequently, one means of compliance for tanks located in whole or in part with the fuselage contour is to establish that they are "main tanks," which continuously hold "fuel reserves" necessary for continued flight and which feed fuel directly to one or more engines.

In addition to the complexities of the fuel system noted above, the implementation and functional characteristics of an aircraft fuel system and particularly the fuel tanks play a critical role in the certification and operational aspects of aircraft. The impact of fuel system design on aircraft operational capabilities encompasses a range of technologies that are more significant than most casual observers would at first realize, particularly when considering the complexities of modern jet aircraft.

Also, since fuel tanks are located in the wings, the effect of wing sweep is to change the longitudinal center of gravity (CG) of the aircraft as fuel is consumed causing a change in aircraft static stability and hence handling characteristics. Optimizing the aircraft longitudinal CG during cruise minimizes profile drag which, in turn, maximizes the operating range of the aircraft and reduces fuel consumption.

For the foregoing reasons, there is a need for a fuel tank system that permits consumption of main tank fuel first, except for a predetermined level of reserve fuel.

For the foregoing reasons, there is a need for a fuel tank that permits a reduced center of gravity envelope for the aircraft and particularly for swept wing configurations.

For the foregoing reasons, there is a need for a method to address the flammability requirements of an aircraft fuel tank that is located in whole or in part in the fuselage contour For the foregoing reasons, there is a need for a fuel tank system that facilitates a reduction of horizontal trim loading.

For the foregoing reasons, there is a need for a fuel tank configuration that permits an optimization of structural weight.

For the foregoing reasons, there is a need for a fuel tank configuration whose benefits result in a corresponding reduction in the total quantity of fuel required to perform a given mission.

For the foregoing reasons, there is a need for establishing the inboard tanks as "main tanks" to demonstrate compliance with federal requirements for flammability criteria without the need of a flammability reduction means.

SUMMARY

This disclosure is directed to a method for controlling the formation of flammable vapors in an aircraft main fuel tank that satisfies the requirements of the standard set forth in 14 CFR 25.981 at Amendment 25-125 by the Federal Aviation Administration, as amended in September 2008. The disclosure further provides that maintaining a predetermined fuel reserve in the main tank throughout the mission is consistent with the criteria established by the National Business Association of America (NBAA) instrument flight rule (IFR) 200 nautical mile reserve.

The disclosure is directed to an aircraft fuel supply system located internal to the wings of the aircraft that fully complies with federal regulations regarding flammability exposure criteria. The aircraft fuel supply system comprises a main fuel tank adjacent the fuselage of the aircraft, a wing tank outboard of the main fuel tank; a collector bay located within the main fuel tank and disposed adjacent the fuselage. The collector bay is in fluid communication with the wing tank for transfer of fuel from the wing tank to the collector tank, but is always capable of drawing fuel from the main tank through flapper valves in the event of a loss of pressurized fuel.

The fuel system is configured to first consume the fuel supply in the main tank except for a reserve level that is maintained throughout the mission. Because a reserve supply of fuel is maintained in the tank the tank ullage is reduced. A reduced ullage limits the volume in which fuel vapors may collect and therefore reduces the aircraft's flammability exposure. The disclosed system utilizes the fuel in the outboard wing tanks by transferring the fuel to a collector bay located in and connected to the main tank. The collector bay feeds the fuel directly to the engines of the aircraft at all times.

Various objects, features, aspects and advantages of the inventive subject matter will become more apparent from the following detailed description of preferred embodiments, along with the accompanying drawings in which like numerals represent like components.

BRIEF DESCRIPTION OF THE DRAWINGS

FIG. 1 is a front elevation view of an embodiment of the aircraft wing tank system configuration.

DEFINITIONS

Prior to describing the present invention in detail, it is useful to provide definitions for key terms and concepts used herein. Unless defined otherwise, all technical and scientific terms used herein have the same meaning as commonly understood by one of ordinary skill in the art to which this invention belongs.

"Fuel tank flammability exposure analysis" means a flammability exposure analysis conducted per FAA procedures for the fuel tank under evaluation to determine fleet average flammability exposure for the airplane and fuel types under evaluation.

"Main Fuel Tank" means a fuel tank that feeds fuel directly into one or more engines and holds required fuel reserves continually throughout each flight.

"Ullage" shall mean the volume within the fuel tank not occupied by liquid fuel.

DETAILED DESCRIPTION

The disclosed technology is directed to a system and method to reduce the flammability exposure of aircraft fuel repositories located within the wing structures. The proposed methods and systems thereby decrease substantially the potential for a catastrophic ignition of the fuel vapor within the wing of the aircraft while the aircraft is in operation. In the proposed implementation of the disclosed technology a significant portion of the fuel within the main fuel tank is consumed by the engines leaving a reserve level within the main fuel tank. The reserve level of fuel within the main tank is sufficient to immerse the fuel pumps located within the main tank in fuel. This immersion by the reserve level of fuel substantially reduces the prospect of ignition of the fuel as the liquid fuel, unlike the fuel vapor, is not combustible. With a reserve level of fuel in the tank the ullage is reduced and therefore the amount of fuel vapor within the main tank is reduced.

The disclosed technology is directed to an aircraft fuel tank configuration and system for orchestrating the management of the fuel within the wings. In an implementation of the disclosed technology and referring to FIG. 1, an aircraft includes a fuselage 100 and a wing 102. The design includes a pair of main tanks 104 (one on each side of the aircraft) that are located in an inboard location (relative to the fuselage 100). The aircraft also has outboard wing tanks 106. A collector 108 is located at the bottom of the main tanks 104.

Fuel is maintained in the collector 108 using flapper valves 110 which allow fuel into the collector from the main tank 104, but will not allow fuel to escape based on pressure differentials between the main tank 104 and inside chamber of the collector 108 caused by the aircraft's orientation while in the air. The wing tanks 106 are fluidly connected to the collector 108 by a conduit 112 which has a flow control valve 114.

Assuming the aircraft is in operation, and has a full tank of fuel, the main tank will be consumed first, but only until the fuel has drained to a predetermined level 124. Once this level is reached, it is maintained. This level of fuel 124 is maintained in the main tank 104 as reserves continually throughout the flight. When the level is hit, a level sensing system causes the flow valves 114 (on each side of the aircraft) to be opened up, allowed fuel from the wing tanks to feed the collector 108 (and thus be consumed by the engines). Only after all the fuel from the wing tanks 106 is consumed are the reserves in the main tanks 104 consumed.

While the preferred form of the present invention has been shown and described above, it should be apparent to those skilled in the art that the subject invention is not limited by the FIGURE and that the scope of the invention includes modifications, variations and equivalents which fall within the scope of the attached claims. Moreover, it should be understood that the individual components of the invention include equivalent embodiments without departing from the spirit of this invention.

It will be understood that certain features and subcombinations are of utility and may be employed without reference to other features and subcombinations and are contemplated within the scope of the claims. Not all steps listed in the various FIGURE need be carried out in the specific order described.

We claim:

1. A method for controlling the formation of flammable vapors in an aircraft main fuel tank located in whole or in part in the fuselage contour wherein each wing includes a main fuel tank, a wing tank outboard of the main fuel tank and a collector tank disposed within the main fuel tank that is in fluid communication with the wing tank; the method comprising:
   (a) initially consuming fuel in the main tank until the fuel quantity has reached a predetermined reserve level;
   (b) sensing that the fuel has reached the predetermined level;
   (c) initiating the operation of at least one valve to transfer fuel from the wing tank to the collector tank thereby maintaining the predetermined level of fuel in the main tank;
   (d) the collector tank including at least one flow limiter to deter the escape of fuel into the main tank; and
   (e) maintaining the reserve fuel in the main tank at the predetermined level throughout the remaining mission of the aircraft.

2. A system for reducing aircraft fuel tank flammability, the system comprising;
   a main fuel tank located in whole or in part in the fuselage contour of the aircraft,
   a wing tank outboard of the main fuel tank;
   a collector tank located within the main fuel tank and disposed adjacent the fuselage, the collector tank in fluid communication with the wing tank for transfer of fuel from the wing tank to the collector tank;
   wherein when the quantity of fuel in the main tank is reduced through consumption by the aircraft engines to a predetermined sensor monitored reserve level withdrawal of fuel from the main tank ceases and fuel transfer from the wing tank commences and continues throughout the remainder of the aircraft mission.

3. A method for controlling the flammability of fuel vapors in an aircraft main fuel tank that is located in whole or in part in the fuselage contour, the method comprising:
   starting at least one engine of the aircraft;
   pumping fuel from the main tank to the at least one engine with at least one fuel pump;
   ceasing the pumping of fuel from the main tank when the fuel reaches a predetermined level thereby limiting the ullage into which fuel vapors may collect;
   transferring fuel from a wing tank to a collector tank, the collector tank disposed within the main tank;
   continuing withdrawal of fuel from the wing tank until the aircraft mission is complete wherein throughout the remaining mission a reserve level of fuel continues to occupy space within the main fuel tank; and
   maintaining a sufficient quantity of fuel in the main tank to continuously submerge the at least one fuel pump during the entire aircraft mission.

4. The method of claim 3, wherein the predetermined level is established for each particular aircraft design.

5. A method for controlling the formation of flammable vapors in an aircraft main fuel tank, the tank located in whole or in part in the fuselage contour wherein each wing includes a main fuel tank, a wing tank outboard of the main fuel tank and a collector tank disposed within the main fuel tank that is in fluid communication with the wing tank; the method comprising:
   (a) initially consuming fuel in the main tank until the fuel quantity has reached a predetermined reserve level;
   (b) sensing that the fuel has reached the predetermined level;

(c) initiating the operation of at least one valve to transfer fuel from the wing tank to the collector tank thereby maintaining the predetermined level of fuel in the main tank;
(d) the collector tank including at least one flow limiter to deter the escape of fuel into the main tank; and
(e) maintaining the reserve fuel in the main tank at the predetermined level throughout the remaining mission of the aircraft.

\* \* \* \* \*